(12) United States Patent
Lee et al.

(10) Patent No.: US 7,639,384 B2
(45) Date of Patent: Dec. 29, 2009

(54) METHOD FOR CONTROLLING ERROR OF INTERNET FAX DATA

(75) Inventors: Eung-don Lee, Daejon (KR); Tae-gyu Kang, Daejon (KR)

(73) Assignees: Electronics and Telecommunications Research Institute, Daejeon (KR); Korea Telecom, Kyungki-Do (KR)

(*) Notice: Subject to any disclaimer, the term of this patent is extended or adjusted under 35 U.S.C. 154(b) by 0 days.

(21) Appl. No.: 12/001,665

(22) Filed: Dec. 11, 2007

(65) Prior Publication Data

US 2008/0094661 A1 Apr. 24, 2008

Related U.S. Application Data

(62) Division of application No. 10/230,587, filed on Aug. 29, 2002, now Pat. No. 7,330,283.

(30) Foreign Application Priority Data

Dec. 27, 2001 (KR) .............................. 2001-86343

(51) Int. Cl.
*G06F 15/00* (2006.01)
*H03M 13/00* (2006.01)
(52) U.S. Cl. ...................... 358/1.15; 358/405; 358/435; 379/100.06; 379/100.17; 370/469; 370/329; 714/774; 714/776
(58) Field of Classification Search ................ 358/1.15, 358/405, 435; 379/100.06, 100.17; 714/774, 714/776; 370/329, 469
See application file for complete search history.

(56) References Cited

U.S. PATENT DOCUMENTS 6,141,788 A * 10/2000 Rosenberg et al. .......... 714/774
6,483,600 B1 * 11/2002 Schuster et al. ............ 358/1.15

(Continued)

FOREIGN PATENT DOCUMENTS

JP 10-0260907 4/2000
JP 10-026324 5/2000

OTHER PUBLICATIONS

Rosenberg et al., "An RTP Payload Format for Generic Forward Error Correction", Network Working Group, Dec. 1999, pp. 1-23.*

(Continued)

*Primary Examiner*—Chan S Park
(74) *Attorney, Agent, or Firm*—Blakely, Sokoloff, Taylor & Zafman LLP

(57) ABSTRACT

Provided are a method for controlling errors of an Internet fax data according to the statue of a network by using a receiver report (RR) message in a real-time transport control protocol (RTCP) and a gateway to which the method is applied. Therefore, transmission errors are reduced and a transmission speed of a fax data is improved in transmitting a fax data over the Internet. The provided method includes receiving a T.38 fax data for analyzing a predetermined QoS motoring data of the T.38 fax data and generating status information, transmitting the status information to a gateway which has transmitted the T.38 fax data, receiving the status information for analyzing a packet loss of the transmitted T.38 fax data based on the status information, and increasing or decreasing a secondary message sequence length based on an analysis result. The provided method can control errors of a T.38 packet in real time, according to the status of a network, in transmitting a T.38 fax data over the Internet. Therefore, the performance of an error control improves, thereby securing a stable communication and improving a transmission speed. As a result, a communication speed increases so that transmission efficiency improves.

4 Claims, 4 Drawing Sheets

U.S. PATENT DOCUMENTS

| | | | |
|---|---|---|---|
| 6,868,146 B2 * | 3/2005 | Kang | 379/100.06 |
| 6,901,080 B1 * | 5/2005 | Beyda et al. | 370/469 |
| 6,957,380 B2 * | 10/2005 | Lee et al. | 714/774 |
| 7,023,805 B2 * | 4/2006 | Tajiri et al. | 370/236 |
| 7,050,187 B1 * | 5/2006 | Fruth et al. | 358/1.15 |
| 2001/0001268 A1 * | 5/2001 | Menon et al. | 370/329 |
| 2003/0002476 A1 * | 1/2003 | Chung et al. | 370/352 |

OTHER PUBLICATIONS

2001 Elsevier Science, "An adaptive protocol for real-time fax communications over Internet", C.K. Yeo, et al., 11 pages.

Rosenberg et al., "An RTP Payload Format for Generic Forward Error Correction," Network Working Group, Dec. 1999, pp. 1-23.

* cited by examiner

METHOD FOR CONTROLLING ERROR OF INTERNET FAX DATA

The present patent application is a Divisional of application Ser. No. 10/230,587, filed Aug. 29, 2002 now U.S. Pat. No. 7,330,283.

BACKGROUND OF THE INVENTION

1. Field of the Invention

The present invention relates to a method for reducing errors in transmitting a fax data over the Internet, and more particularly, to a method for controlling errors of an Internet fax data according to the statue of a network by using a receiver report (RR) message in a real-time transport control protocol (RTCP) and a gateway to which the method is applied.

2. Description of the Related Art

Korean Laid-open Patent No. 1999-0051938 discloses an apparatus and a method for restoring an image to restore an image of a fax data distorted in transmitting the fax data. In this case, when an error occurs in a received fax data, the apparatus decides a modulation method for transmitting and receiving the fax data so as to read out a plurality of error patterns according to the decided modulation method and to monitor errors in the received fax data, line-by-line. Thereafter, if an error occurred in a line, the apparatus corrects the error by using the error pattern to provide a high quality image to a user.

Korean Laid-open Patent No. 1999-0086290 discloses an apparatus and a method for checking a transmission status of a fax data. In this case, when a sender, which has transmitted a fax data, requires a voice demand function, a recipient automatically services a reception status of the fax data. Thus, the sender conveniently recognizes the transmission status of the fax data. In addition, the recipient services other messages to improve reliability of the transmission of the fax data.

However, conventional apparatuses and methods concern with the transmission of a fax data only over a telephone network using a conventional T.30 protocol. Therefore, the conventional apparatuses and methods cannot be applied to the transmission of a fax data using a T.30 protocol. Furthermore, in the conventional methods, a method for an error control in the transmission of a fax data is fixed; therefore, reliability of the transmission of a fax data is lowered when the status of a telephone network is deteriorated.

SUMMARY OF THE INVENTION

To solve the above-described problems, it is an objective of the present invention to provide a method for a network adaptive error control according to the status of a network, in transmitting a fax data over the Internet by using a T.38 protocol and a gateway to which the method is applied.

To accomplish the above objective of the present invention, a gateway according to the present invention includes a first protocol process unit transmitting and receiving an H.323 call setup data, a second protocol process unit generating status information on a fax data based on the fax data transmitted and received between gateways by using a real-time transport protocol, a third protocol process unit receiving the status information for analyzing the status of a network and selecting a method for controlling errors, and a connection unit converting a predetermined protocol data for the FoIP including the H.323 call setup data into a data architecture appropriate to a packet switching network for transmitting and receiving the converted data to and from the packet switching network.

To accomplish the above objective of the present invention, a method for controlling errors of an Internet fax data includes receiving a T.38 fax data, analyzing a predetermined quality of service (QoS) monitoring data of the T.38 fax data, and transmitting the analysis result of the act (b) to the gateway which has transmitted the T.38 fax data.

To accomplish the above objective of the present invention, a method for controlling errors of an Internet fax data includes receiving analysis information on a T.38 fax data which has transmitted, from a gateway, analyzing a packet loss of the transmitted T.38 fax data based on the analysis information, and increasing or decreasing a secondary message sequence length based on the analysis result.

To accomplish the above objective of the present invention, a method for controlling errors of an Internet fax data includes receiving a T.38 fax data for analyzing a predetermined QoS motoring data of the T.38 fax data and generating status information, transmitting the status information to a gateway which has transmitted the T.38 fax data, receiving the status information for analyzing a packet loss of the transmitted T.38 fax data based on the status information, and increasing or decreasing a secondary message sequence length based on an analysis result.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
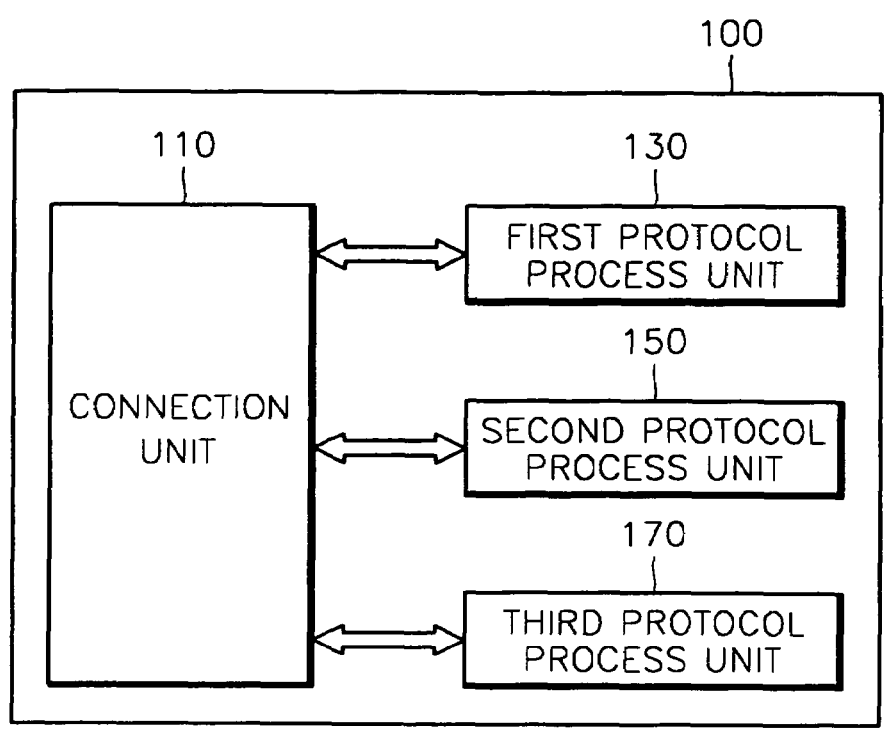
FIG. 1 is a diagram of a gateway to which a method for controlling errors of an Internet fax data according to the present invention is applied.
Figure 2:
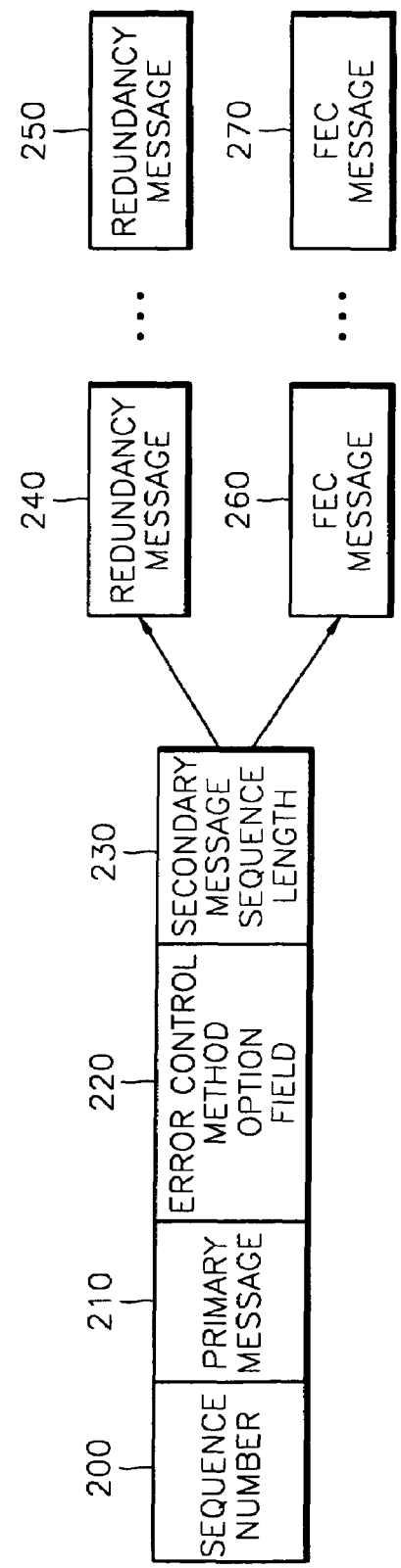
FIG. 2 is a diagram illustrating the constitution of a T.38 packet.

FIG. 1 is a diagram of a gateway to which a method for controlling errors of an Internet fax data according to the present invention is applied, and FIG. 2 is a diagram illustrating the constitution of a T.38 packet.

The blocks of a gateway 100 for transmitting and receiving an Internet fax data will now be described. Here, the gateway 100 is a terminal device providing a bi-directional communication between an H.323 terminal or a gateway on a local area network (LAN) and an International Telecommunication Union (ITU) terminal on a wide area network (WAN) in real time. A first protocol process unit 130 sends, receives, and processes an H.323 call setup data, which is transmitted into the gateway 100. An H.323 protocol is a multimedia communication system standard which supports audio and video data in a packet-based network including the Internet, where the standardization is formulated by the International telecommunication Union-Telecommunication Standardization Sector (ITU-T). The first protocol process unit 130 processes H.225.0 (call signaling protocols and media stream packetization for packet-based multimedia communication systems) registration, admission, and status (RAS), H.225.0 Q931, and H.245 messages.

A second protocol process unit 150 analyzes and processes a quality of service (QoS) monitoring data, such as packet loss and jitter of a fax data which is transmitted and received between the gateways 100, based on a real-time transport control protocol (RTCP), and reports analysis results to a third protocol process unit 170.

The third protocol process unit 170 selects a method for controlling errors based on the QoS monitoring data transmitted from the second protocol process unit 150. A procedure for a method for controlling errors will now be described in detail. The third protocol process unit 170 performs conversions between a T.30 data and a T.38 data. In other words, the third protocol process unit 170 converts a T.30 data transmitted via a public switched telephone network (PSTN) into a T.38 data and transmits the T.38 data to a connection unit 110 to interlock with the PSTN. In addition, the third protocol process unit 170 receives a T.38 data transmitted over the packet network by using the connection unit 110 and converts the T.38 data into a T.30 data to interlock with the PSTN.

The function of the connection unit 110 is divided into conversion of an upper protocol data and conversion of an upper data. Here, the connection unit 110 converts the upper protocol data, such as H.323, RTCP, and T.38, into a transmission control protocol (TCP) data or a user datagram protocol (UDP) data to transmit over a packet network like the Internet. The connection unit 110 converts the upper data loaded on a TCP data or a UDP data into a data appropriate to the Internet.

FIG. 2 is a diagram illustrating the constitution of a T.38 packet. As shown in FIG. 2, a T.38 packet is formed of a sequence number 200, a primary message 210, an error control method option field 220, a secondary message sequence length 230, and secondary message sequences 240, 250, 260, and 270. Since the elements of the T.38 packet are well known to those skilled in the art, descriptions about the elements of the T.38 packet will be omitted.

Error control methods include a redundancy method and a forward error correction (FEC) method. Here, the error control method is determined by the value of the error control method option field 220 of the T.38 packet of FIG. 2. Therefore, the secondary message sequences are filled with redundancy messages 240 and 250 or FEC messages 260 and 270.

The secondary message sequence length 230, establishing the length of the secondary message sequences, denotes the length of the redundancy messages 240 and 250 or the FEC messages 260 and 270. When the secondary message sequence length 230 increases, an error control performance improves. In particular, in the case where the FEC error control method is used, a burst error can be corrected by increasing the secondary message sequence length 230.

However, in a conventional error control method, an error control method option field 220 and a secondary message sequence length 230 are determined by a manager in an early stage and not changed regardless of changes in the status of a network through which a T.38 fax data is transmitted, thereby causing inefficiency. In other words, when the status of the network is good, a secondary message sequence length becomes so excessively large that a transmission speed is deteriorated. When the status of the network is bad, the secondary message sequence length becomes so relatively small that errors are likely to occur.

Figure 3:
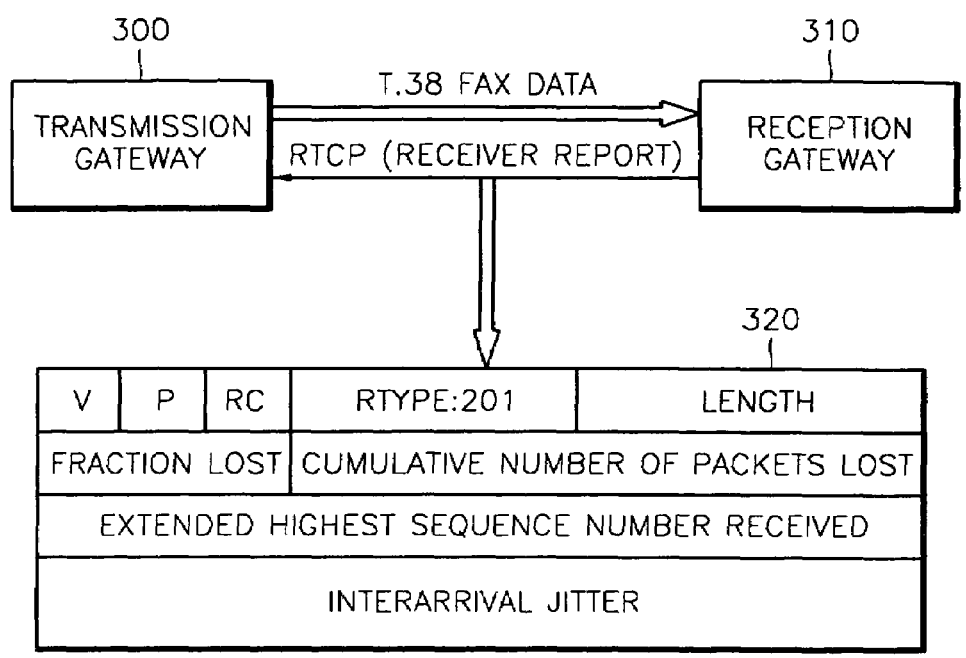
FIG. 3 is a diagram for illustrating the constitution of a receiver report (RR) message of a real-time transport control protocol (RTCP) in transmitting and receiving an Internet fax data between gateways.
Figure 4:
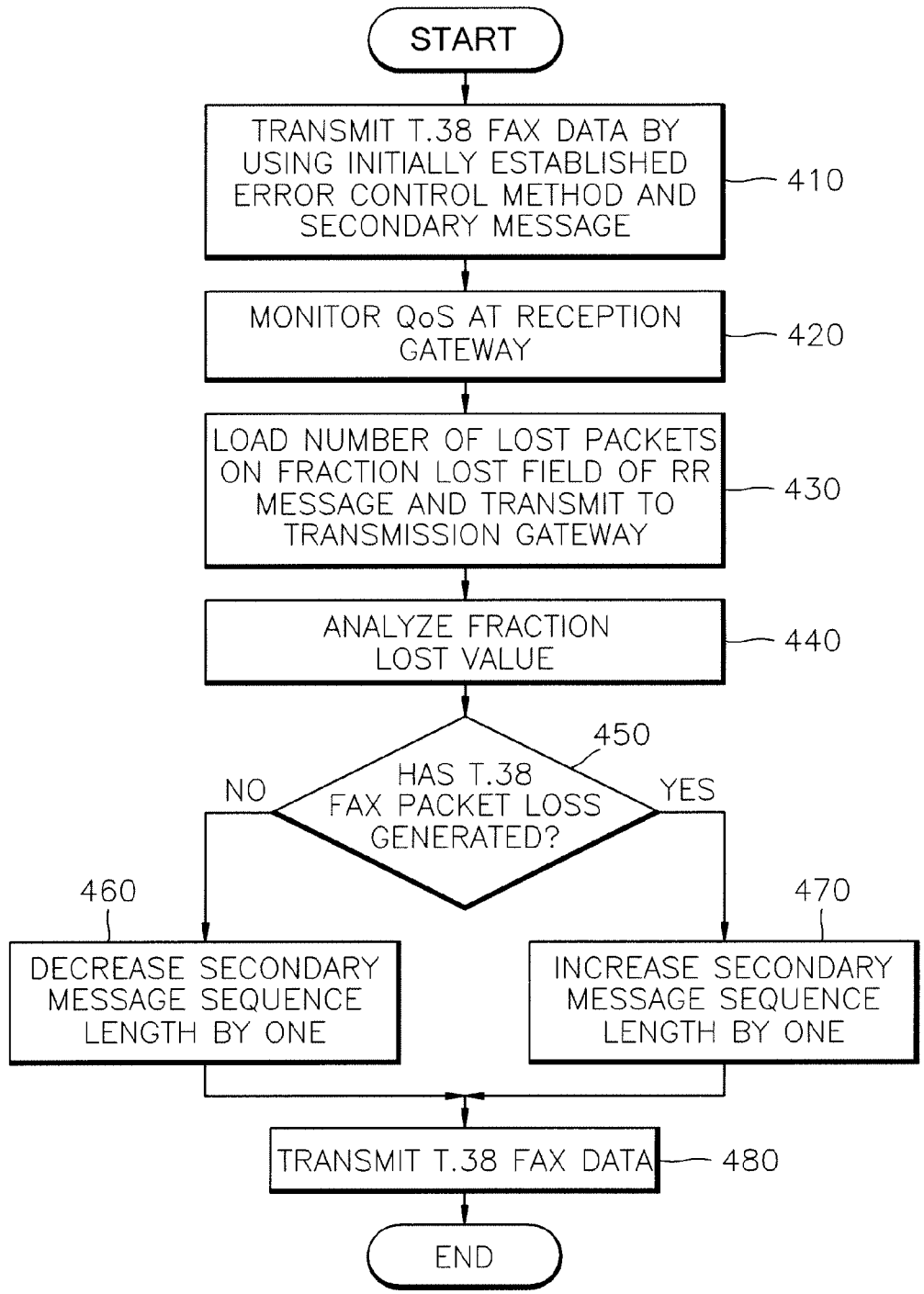
FIG. 4 is a flowchart for explaining a method for controlling errors of an Internet fax data according to the present invention.

An improved method for correcting errors in a communication between gateways 100 of FIG. 1 will be described as follows. FIG. 3 illustrates an RR message type of an RTCP in transmitting and receiving an Internet fax data between gateways and FIG. 4 illustrates a method for controlling errors of an Internet fax data according to the present invention.

With reference to FIG. 3, a transmission gateway 300 transmits a T.38 fax data to a reception gateway 310 and the reception gateway 310 transfers status information on the T.38 fax data as an RR message of an RTCP. Here, since the contents of the RR message 320 is well known to those skilled in the art, detailed description about the RR message 320 will be omitted.

The fields of ordinary messages of an RTCP, for example, a sender report (SR), an RR, an SDES, and a BYE, are related to a real-time transport protocol (RTP) packet. However, in the case where an Internet fax data is transmitted and received, a fax packet is loaded on an UDP and not on an RTP so that an RTP packet is not generated. Consequently, in a method for controlling errors according to the present invention, the second protocol process unit 150 relates the internal field of an RTCP message to a T.38 packet so as to operate the RTCP message with the third protocol process unit 160, in transmitting an Internet fax data.

A procedure of a method for controlling errors will now be described in detail. A transmission gateway 300 having initially established method for controlling errors and secondary message sequence length transmits a T.38 fax data in step 410. A reception gateway 310 receives the T.38 fax data while a third protocol process unit 170 monitors the QoS of the T.38 fax data in step 420. The third protocol process unit 170 loads a packet loss number of the received T.38 fax data on a fraction lost field of an RR message 320 and transmits the packet loss number to the transmission gateway 300 in step 430.

When the transmission gateway 300 receives the RR message 320 while transmitting the T.38 fax data by using the initially established method for controlling errors and secondary message sequence length, the transmission gateway 300 reads out and analyzes the value the fraction lost field in step 440. According to the analysis results, it is determined whether the T.38 fax data packet transmitted from the transmission gateway 300 has been lost in step 450. If the T.38 fax data packet has been lost, the secondary message sequence length 230 is increased by one in step 470. If the T.38 fax data packet has not been lost, the secondary message sequence length 230 is decreased by one in step 460. Then, the T.38 fax data is transmitted in step 480.

A method for controlling errors of an Internet fax data according to the present invention can be realized as a code on a recording medium which can be read out by a computer. Here, the recording medium includes any kind of recording devices in which data are recorded, such as ROM, RAM, CD-ROM, a magnetic tape, a floppy disk, and an optical data recording device, while further including a carrier wave, i.e., transmission over the Internet. In addition, the recording media read out by a computer are distributed to computer systems, connected by a network, to record and execute codes, which can be read out by a computer, in a distribution manner.

It is noted that the present invention is not limited to the preferred embodiment described above, and it is apparent that variations and modifications by those skilled in the art can be effected within the spirit and scope of the present invention defined in the appended claims.

As described above, a method for controlling errors of an Internet fax data according to the present invention can control errors of a T.38 packet in real time, according to the status of a network, in transmitting a T.38 fax data over the Internet. Therefore, the performance of an error control improves, thereby securing a stable communication and improving a transmission speed. As a result, a communication speed increases so that transmission efficiency improves.

What is claimed is:

1. A gateway for a fax over Internet protocol (FoIP), the gateway comprising:
    a first protocol process unit transmitting and receiving an H.323 call setup data;
    a second protocol process unit generating status information on a fax data based on analysis of a predetermined quality of service (QoS) monitoring data of the fax data transmitted and received between gateways by using a real-time transport protocol;
    a third protocol process unit receiving the status information for analyzing the status of a network and selecting a method for controlling errors, and the third protocol process unit further performs conversion between data transmitted via the public switched telephone network (PSTN) and data transmitted via the packet switching network; and
    a connection unit receiving an upper protocol data and said converted data and sending the upper protocol data and the converted data to the PSTN or the packet switching network, and converting a predetermined protocol data for the FoIP including the H.323 call setup data into a data architecture appropriate to a packet switching network for transmitting the converted data to the packet switching network,
    wherein the transmission gateway adjusts a secondary message sequence length in real-time based on the analysis of the predetermined QoS.

2. The gateway for an FoIP of claim 1, wherein the third protocol process unit performs conversion between a T.30 data transmitted via the public switched telephone network PSTN and a T.38 data transmitted via the packet switching network.

3. The gateway for an FoIP of claim 1, wherein the connection unit converts said predetermined protocol data for the FoIP into a data architecture formed by at least one protocol of a transmission control protocol (TCP) or a user datagram protocol (UDP).

4. The gateway for an FoIP of claim 1, wherein the connection unit converts the data architecture into a data architecture appropriate to the Internet.

* * * * *